3,407,178
WATER REMOVAL FROM CONTINUOUS
XYLENE - FORMALDEHYDE CONDEN-
SATION REACTION
Raymond L. Heinrich, Baytown, Tex., assignor to Esso
Research and Engineering Company
Filed June 14, 1965, Ser. No. 463,682
7 Claims. (Cl. 260—67)

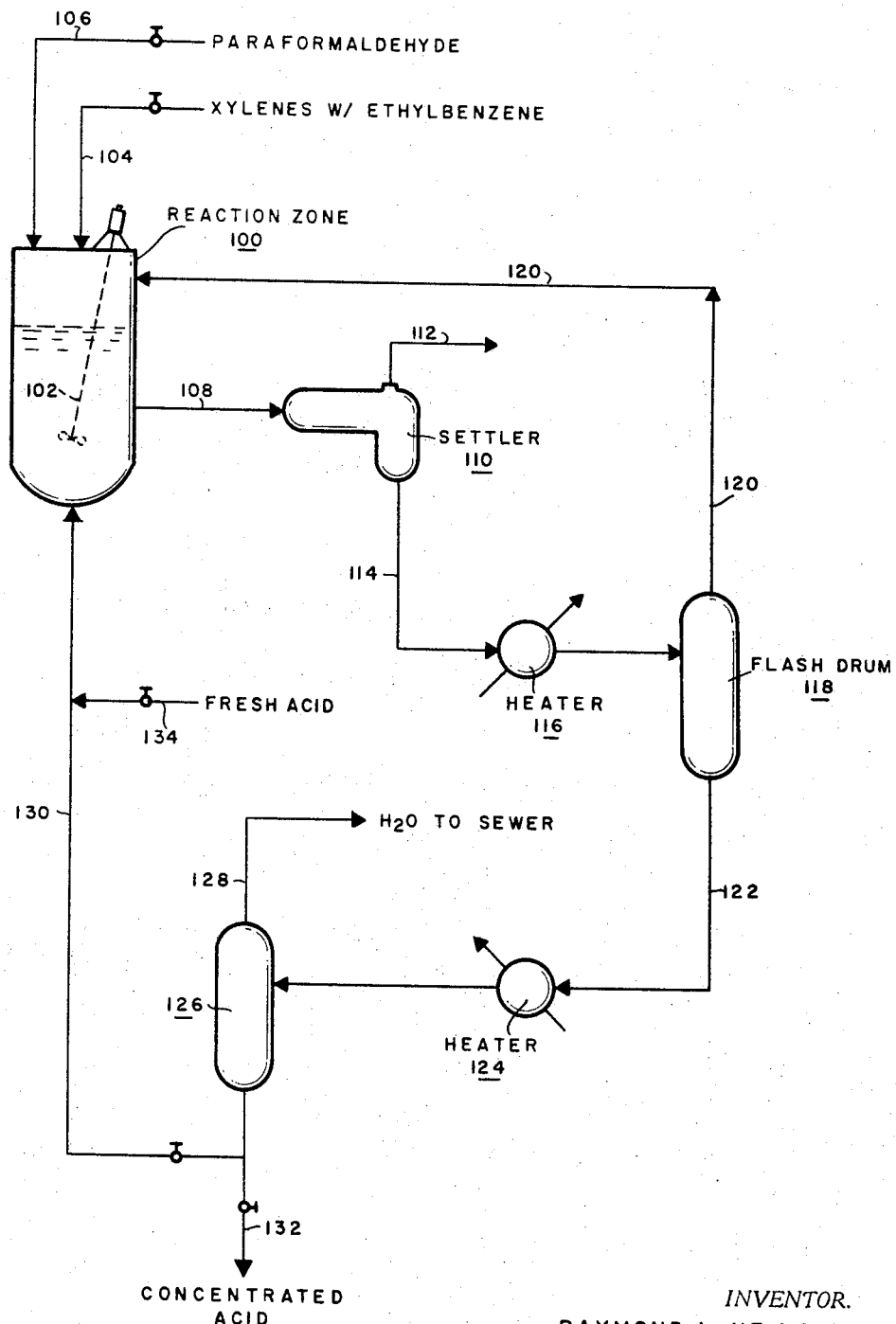

ABSTRACT OF THE DISCLOSURE

The aqueous acid layer from the condensation of an aromatic hydrocarbon with formaldehyde in the presence of aqueous sulfuric acid is heated to obtain a fraction containing formaldehyde and water which is recycled to the condensation step while the remainder is further heated to vaporize water and concentrate the sulfuric acid, the water vaporized on the second heating being discarded and the concentrated acid recycled.

---

The present invention relates to the condensation of aromatic hydrocarbons with formaldehyde in the presence of an aqueous sulfuric acid. More particularly, the present invention relates to a continuous method of condensing aromatic hydrocarbons with formaldehyde in the presence of an aqueous sulfuric acid catalyst, while continuously removing water of reaction from the condensation reaction zone. In its most specific aspects, the present invention relates to a two-step method of removing water from a condensation reaction zone by removing an aqueous sulfuric acid stream from the reaction zone, heating the aqueous acid stream to drive off most of the formaldehyde dissolved therein and a portion of the water, and then heating the aqueous acid stream to drive off a second portion of water and to concentrate the acid to a desired degree.

It has long been known that aromatic hydrocarbons can be condensed with formaldehyde in the presence of acidic catalysts. For example, Dr. H. Wegler in Angew. Chem., A60 No. 4, pp. 88–96 (1948), published an article entitled, "The Condensation of Aromatic Compounds with Formaldehyde—A New Group of Reactive Resins." In this publication, Dr. Wegler noted that certain aromatic hydrocarbons reacted with formaldehyde in the presence of acidic catalysts. Likewise, in British Patent 912,355, published Dec. 5, 1962, Sumitomo Bakelite Company discussed the condensation of benzene, toluene and xylene with formaldehyde in the presence of sulfuric acid. A drawback of the use of sulfuric acid as the catalyst, however, is the fact that the catalyst becomes continually diluted by the water contained in the formaldehyde feed and water formed by the reaction of the aromatic hydrocarbons with formaldehyde to the extent that the catalyst soon becomes deactivated (by becoming too dilute to be effective).

By the present invention, good control of acid concentration in the reaction zone is provided, and at the same time the formaldehyde (which is easily dissolved in aqueous sulfuric acid within the reaction zone) is recovered and recycled to the reaction zone without being wasted. Further, the concentration step wherein water is driven off from the sulfuric acid is carried out after the removal of both the formaldehyde and a portion of the water so that an accurate control of the recycle acid stream concentration can be maintained.

In the practice of the present invention, it has been found that the vapor phase over sulfuric acid in the reaction zone of a xylene-formaldehyde condensation reaction possesses an abnormally high ratio of formaldehyde to water. This is due to the "dehydrating" or "hydrogen bonding" effect of the sulfuric acid in the reactor.

The same phenomenon obtains when the sulfuric acid is withdrawn as a side stream from the reaction zone and is heated to vaporized substantially all of the formaldehyde from the acid. It has been found that the acid can be heated to a temperature of 200° F. to 240° F. at a pressure of 10 to 30 p.s.i.a. for a time sufficient to vaporize from 85 to 99 wt. percent of the dissolved formaldehyde from the acid phase. A portion of the water of said aqueous phase will, of course, be vaporized along with the formaldehyde, about 1.5 to 6.0 parts by weight of water to each part formaldehyde vaporized.

After the removal of the formaldehyde and a portion of the water, the aqueous acid stream is further heated at a temperature of 180° F. to 260° F. and a pressure of 2 to 30 p.s.i.a. for a time sufficient to vaporize a second portion of water and to concentrate the acid to about 50 to 70 wt. percent. Lower pressure may be used in this second step of the process since this promotes preferential vaporization of water over formaldehyde, avoids prolonging exposure of the acid phase to high temperature and reduces the temperature of the acid stream to a more consistent value for recycle to the reactor. The water removed in this second step is discarded from the system, and the concentrated acid is recycled to the reaction zone. The amount of water removed in the second phase of the aqueous acid stream depends upon the amount of concentration which is desired as well as upon the amount of water which is removed during the formaldehyde recovery step.

Generally speaking, the ratio of the aqueous acid stream which is removed from the reaction zone to the aromatic hydrocarbon feed stream introduced into the reaction zone is from about 0.2 to about 2.0 vols/vol. The amount of the acid stream which is withdrawn and recycled to a great extent depends on the amount of water to be removed from the system, and this is a dependent variable which is affected by the molecular weight and composition of the aromatic feed and the amount of aromatic hydrocarbon reacted with formaldehyde in the reaction zone. The form of formaldehyde employed also influences the amount of water to be removed. When aqueous formaldehyde of 30 to 40 wt. percent concentration is employed as a source of formaldehyde, from three to six times as much water must be removed as compared to the use of paraformaldehyde containing only 6 to 10 wt. percent water. Gaseous formaldehyde or trioxane employed as a source of formaldehyde requires somewhat less water removal than use of paraformaldehyde.

In a preferred embodiment, the aromatic hydrocarbon being used is a mixture of isomeric xylenes, which contains also some ethylbenzene, as is recovered in normal operations of a petroleum refinery. When the aromatic hydrocarbon feed is a xylene admixture, and the formaldehyde being used is a solid paraformaldehyde having a water content of about 5 to 10 wt. percent, the reaction zone is maintained at a temperature of about 190° F. to 230° F., the volume ratio of the aqueous acid stream to the feed xylene stream is about 0.2 to 0.5, the concentration of the aqueous acid stream is about 30 to 45 wt. percent $H_2SO_4$ on a formaldehyde-free basis when removed from the reaction zone, the aqueous acid stream is heated first to a temperature of about 200° F. to 240° F. at a pressure of about 15 to 30 p.s.i.a. to vaporize formaldehyde and some water, and is then heated at a temperature of about 190° F. to 240° F. and a pressure of 5 to 20 p.s.i.a. to concentrate the acid to about 50 to 70 wt. percent, at which time the acid is recycled into the reaction zone.

All of this may be more clearly understood by reference to the drawing, wherein the reaction zone is shown schematically as a stirred kettle 100, provided with a propeller-type stirring means 102. About 1,000 gal./hr. (8,700 lbs./hr.) of an aromatic hydrocarbon, such as a refinery stream comprising an admixture of xylenes with ethylbenzene, are introduced by way of line 104, while 2,700 lbs./hr. of solid paraformaldehyde of 91 wt. percent formaldehyde content may be introduced by way of line 106. About 3,800 lbs./hr. of 50 to 70 wt. percent H₂SO₄ are introduced by line 130. Reflux means are provided whereby the vapor phase is allowed to reflux as a means of removal of the heat of reaction, or cooling coils or other means of heat removal may be employed. About 15,200 lbs./hr. of a liquid phase product are removed from the reactor by way of line 108 and introduced into a settler 110. From the settler 110 about 10,000 lbs./hr. of a hydrocarbon product may be removed by way of line 112 for recovery and use, while about 5,200 lbs./hr. of an aqueous acid stream containing from 3 to 5 wt. percent formaldehyde and having an H₂SO₄ concentration of 38 to 42 wt. percent are removed by way of line 114 and are heated by way of heater 116 to a temperature of about 240° F. The aqueous acid stream is then introduced into a flash drum 118, wherein from 85 to 99 wt. percent of the formaldehyde carried by the acid stream will be vaporized as well as a portion of the water (from 2 to 6 lbs./lb. of CH₂O vaporized). The formaldehyde-water stream is recycled by way of line 120 into the reaction zone. The aqueous acid after removal of formaldehyde and a portion of the water is then passed by way of line 122 and heater 124 into the drum 126. At a temperature of about 190° F. to 240° F., the pressure is reduced to about 10 to 20 p.s.i.a., and it is maintained under these conditions until the acid concentration is increased to about 50 to 70 wt. percent. The water vapor that is given off overhead is passed by way of line 128 and is discarded from the system, while the concentrated acid is recycled by way of line 130° into the reaction zone 100. If desired, a portion of the concentrated acid can be removed from the system by way of line 132 and replaced by fresh acid introduced by way of line 134.

EXAMPLE 1

A mixture of one mol of sulfuric acid, one mol formaldehyde, and six mols water was subjected to a flash distillation at 15 p.s.i.a., 207° F. overhead temperature, and 232° F. bottoms temperature, to recover a 5 wt. percent overhead fraction and a 95 wt. percent bottoms fraction. Analyses of these fractions are as follows:

TABLE I

| Total Fraction | Charge | Overhead | Bottoms |
| --- | --- | --- | --- |
| Wt. percent H₂SO₄ | 41.0 | Nil | 43.6 |
| Wt. percent formaldehyde | 12.8 | 34.6 | 9.9 |
| Wt. percent water | 46.2 | 65.0 | 46.5 |
| H₂SO₄-free basis: | | | |
| Wt. percent formaldehyde | 21.7 | 34.6 | 17.6 |
| Wt. percent water | 78.3 | 65.0 | 82.4 |

Distillation of a sulfuric acid-free mixture of one mol of formaldehyde and six mols of water to obtain a 5% overhead at 15 p.s.i.a. resulted in the following fractions:

TABLE II

| | Charge | Overhead | Bottoms |
| --- | --- | --- | --- |
| Wt. percent formaldehyde | 21.7 | 21.5 | 21.8 |
| Wt. percent water | 78.3 | 78.5 | 78.2 |

In the presence of sulfuric acid the vapor pressure of water is greatly depressed compared to vapor pressure of formaldehyde making possible the selective removal of formaldehyde from the mixture by distillation.

EXAMPLE 2

A mixture of one mol of sulfuric acid, 1.5 mols formaldehyde and 9 mols water was subjected to a flash distillation at 15 p.s.i.a., 205° F. overhead vapor temperature, and 221° F. bottoms temperature, to recover a 5 wt. percent overhead fraction and a 95 wt. percent bottoms fraction. Analyses of these fractions are as follows:

TABLE III

| Total Fraction | Charge | Overhead | Bottoms |
| --- | --- | --- | --- |
| Wt. percent H₂SO₄ | 31.7 | Nil | 33.5 |
| Wt. percent Formaldehyde | 14.9 | 37.5 | 12.7 |
| Wt. percent Water | 53.4 | 64.3 | 53.8 |
| H₂SO₄—Free Basis: | | | |
| Wt. percent Formaldehyde | 21.8 | 37.5 | 19.1 |
| Wt. percent water | 78.2 | 64.3 | 80.9 |

Distillation of a sulfuric acid-free mixture of 1.5 mols of formaldehyde and 9 mols of water to obtain a 5% overhead fraction at 15 p.s.i.a. produced the following fractions:

TABLE IV

| | Charge | Overhead | Bottoms |
| --- | --- | --- | --- |
| Wt. percent formaldehyde | 21.8 | 21.4 | 22.0 |
| Wt. percent water | 78.2 | 78.6 | 78.0 |

These results confirm those of Example 1, that it is possible to remove by further distillation any practical amount of the formaldehyde from the sulfuric acid-water-formaldehyde mixture. Water containing a relatively small concentration of formaldehyde may then be distilled from the remaining bottoms fraction to obtain the desired concentration of H₂SO₄ for recycle.

EXAMPLE 3

An aromatic-formaldehyde condensation was carried out charging 1359 g. mixed xylenes (m-xylene, 63 wt. percent; p-xylene, 13 wt. percent; o-xylene, 11 wt. percent; ethylbenzene, 13 wt. percent), 634 g. paraformaldehyde (91 wt. percent formaldehyde content, 9 wt. percent water), and 600 g. sulfuric acid (48.9 wt. percent H₂SO₄). The xylenes and formaldehyde were heated in a vigorously stirred, glass round-bottom flask equipped with a reflux condenser to 203° F., at which point some reflux occurred. Over a period of 3½ hours the sulfuric acid was added and the contents of the flask were further refluxed for 2 hours longer, at which time the temperature was 212° F.

Oil and acid phases were separated on settling at about 180° F. The oil phase was water washed and distilled to recover a condensate equivalent to 66.6 wt. percent of the xylenes charged of quality usually obtained in this type of reaction.

The acid phase was subjected to a simple distillation at 15 p.s.i.a. to obtain the cuts shown below (2000 g. acid charged to the distillation):

TABLE V

| | Wt. percent of Total Acid | | Composition of Cut, Wt. percent Formaldehyde, Balance Water | Composition of Bottoms Remaining After Taking Cut, Wt. percent | |
|---|---|---|---|---|---|
| | Cut | Bottoms Remaining | | H₂SO₄ | Formaldehyde |
| Total Acid | | | | 37.0 | 4.2 |
| Cut No.: | | | | | |
| 1 | 2 | 98 | 22.0 | 37.8 | 3.9 |
| 2 | 2 | 96 | 19.8 | 38.5 | 3.5 |
| 3 | 2 | 94 | 18.8 | 39.3 | 3.2 |
| 4 | 2 | 92 | 18.3 | 40.2 | 2.9 |
| 5 | 2 | 90 | 17.4 | 41.1 | 2.6 |
| 6 | 2 | 88 | 16.5 | 42.1 | 2.2 |
| 7 | 2 | 86 | 15.2 | 43.1 | 1.9 |
| 8 | 2 | 84 | 14.0 | 44.1 | 1.6 |
| 9 | 2 | 82 | 12.5 | 45.2 | 1.4 |
| 10 | 2 | 80 | 10.9 | 46.3 | 1.1 |
| 11 | 4 | 76 | 8.2 | 48.8 | 0.8 |
| 12 | 4 | 72 | 5.2 | 51.6 | 0.5 |
| 13 | 4 | 68 | 4.0 | 54.7 | 0.3 |
| 14 | 4 | 64 | 2.0 | 58.0 | 0.2 |
| Cuts 1 to 10 | 20 | 80 | 16.5 | 46.3 | 1.1 |
| Cuts 11 to 14 | 16 | 64 | 4.8 | 58.0 | 0.2 |

This distillation illustrates the practice of my invention. Any desired amount of water produced in the aromatic-formaldehyde condensation may be removed with a minimum loss of formaldehyde by first flashing off a formaldehyde-rich portion of the spent acid for return to the reaction zone and then flashing off a water-rich portion of the acid phase for rejection.

Referring to the table above, flashing off a portion of the spent acid corresponding to cuts 1 to 10, inclusive, 20 wt. percent of the acid, results in recovery of a fraction containing 16.5 wt. percent formaldehyde, the balance (83.5 wt. percent) water, for return to the reaction zone. The individual cuts produce fractions containing from about 22.0 to about 10.9 wt. percent formaldehyde and from about 78.0 to about 89.1 wt. percent water.

Then, flashing off a portion of the spent acid corresponding to cuts 11 to 14, inclusive, 16 wt. percent of the original spent acid, results in production of a material for rejection containing 4.8 wt. percent formaldehyde, the balance water. The acid for return to the reaction zone is enriched to 58 wt. percent $H_2SO_4$.

Having disclosed the essence of the present invention and a specific embodiment thereof, what is intended to be covered by Letters Patent should be limited not by the specific examples herein given, but rather by the appended claims.

I claim:

1. In the continuous condensation in a reaction zone of an aromatic hydrocarbon with formaldehyde, in the presence of an aqueous sulfuric acid catalyst, the improvement of:

continuously withdrawing an aqueous acid stream from said reaction zone,
    said acid stream having an $H_2SO_4$ concentration of 30 to 45 wt. percent and from 2 to 15 wt. percent dissolved formaldehyde, heating said aqueous acid stream to a temperature of 200° F. to 240° F. at a pressure of 10 to 30 p.s.i.a. for a time sufficient to vaporize from 85 to 99 wt. percent of the dissolved formaldehyde and a portion of the water of said aqueous acid stream, recycling to said reaction zone at least a portion of said vaporized formaldehyde and water, further heating said aqueous acid stream to a temperature of 180° F. to 260° F. at a pressure of 2 to 30 p.s.i.a. for a time sufficient to vaporize a second portion of water and to concentrate said acid to about 50 to 70 wt. percent $H_2SO_4$, discarding said second portion of water from said system, and recycling said concentrated acid to said reaction zone.

2. A process in accordance with claim 1 wherein the volume ratio of said aqueous acid stream to the aromatic hydrocarbon feed stream is from 0.2 to 2.0.

3. A process in accordance with claim 1 wherein the aromatic hydorcarbon is a mixture of isomeric xylenes.

4. A process in accordance with claim 1 wherein the aromatic hydrocarbon is a mixture of isomeric xylenes, the reaction temperature is about 190° F. to 230° F., the aqueous acid stream/feed xylenes volume ratio is about 0.2 to 0.5, the concentration of the aqueous sulfuric acid stream is about 30 to 45 wt. percent, the aqueous sulfuric acid stream is heated to a temperature of about 200° F. to 240° F. at a pressure of about 15 to 30 p.s.i.a. to vaporize formaldehyde and water, and is then heated at a temperature of about 190° F. to 240° F. and a pressure of about 5 to 20 p.s.i.a. to concentrate the acid to about 50 to 70 wt. percent.

5. A method of separating formaldehyde from formaldehyde-containing aqueous sulfuric acid to obtain a formaldehyde-rich aqueous product and a formaldehyde-lean aqueous discard stream which comprises:

heating said formaldehyde-containing aqueous sulfuric acid to flash off a formaldehyde-rich product consisting essentially of from about 22.0 to about 10.9 wt. percent formaldehyde and from about 78.0 to about 89.1 wt. percent water, and then flashing off a formaldehyde-lean aqueous product in sufficient amounts whereby the sulfuric acid concentration is reconstituted.

6. A method in accordance with claim 5 wherein the formaldehyde-rich product consists essentially of about 16.5 wt. percent formaldehyde and 83.5 wt. percent water.

7. A method in accordance with claim 5 wherein the formaldehyde-rich product is about 5 wt. percent of the total acid.

References Cited
UNITED STATES PATENTS

| | | | |
|---|---|---|---|
| 2,713,571 | 7/1955 | Gordon et al. | 260—67 |
| 2,914,579 | 11/1959 | Erich | 260—668 |
| 2,958,676 | 11/1960 | Krzikalla et al. | 260—67 |
| 3,000,859 | 9/1961 | Mirviss et al. | 260—67 |
| 3,303,167 | 2/1967 | Kakiuchi et al. | 260—67 |

WILLIAM H. SHORT, *Primary Examiner.*

L. M. PHYNES, *Assistant Examiner.*